Patented Mar. 12, 1940

2,193,430

UNITED STATES PATENT OFFICE 2,193,430

PHENYL MERCURY OXYPHENOL AND A PROCESS OF MAKING IT

Karl Memminger and Bernhard Gaudian, Magdeburg-Sudost, Germany, assignors to Fahlberg-List Aktiengesellschaft Chemische Fabriken, Magdeburg-Sudost, Prussia, Germany, a firm of Germany No Drawing. Application March 20, 1937, Serial No. 132,088. In Germany April 24, 1936

4 Claims. (Cl. 260—433)

It has been proposed to produce organic mercury compounds by causing a complex organic mercury compound of the type R.Hg.OH, wherein R is an aromatic residue such as phenyl, tolyl or the like, to react with phenol or a homologue thereof. The hydroxyl group of the phenol reacts with the mercury compound with elimination of water, the product being a mercury compound which is practically insoluble in water.

When the aromatic mercury compound of the type R.Hg.OH (wherein R is an aromatic residue such as phenol, tolyl or the like) is caused to react with a polyhydric phenol, for instance resorcinol or hydroquinone there are also obtained compounds in which, analogously to the above named known compounds, the hydroxyl groups have entered into reaction with the mercury compound whereby each phenolic hydroxyl group has reacted with one mol. of the mercury compound.

The present invention is based on the observation that the foregoing phenomenon does not occur in the case of polyhydric phenols in which either the hydroxyl groups are in ortho-position to each other as, for example, in the case of pyrocatechol or when the hydroxyl groups are in meta-position to each other, there is also a side chain, for instance, as is the case in phenylethyl-resorcinol.

Such polyhydric phenols enter into reaction with the mercury compound R.Hg.OH in such a manner that there is a free hydroxyl group remaining.

Pyrogallol which is a trihydric phenol behaves in similar manner, two of the hydroxyl groups being in ortho-position to each other. Here again, therefore, one hydroxyl group remains free and only two enter into reaction with the mercury compound R.Hg.OH.

Thus there is a selective reaction of the hydroxyl groups with the mercury compound in the case of these polyhydric phenols, but the phenomenon could not be predicted.

The invention comprises a process for making organic mercury compounds, wherein a polyhydric phenol in which one hydroxyl group has no tendency to partake in the reaction, is caused to react with the hydroxide of a mercurial aromatic hydrocarbon.

The invention comprises also a process for making organic mercury compounds, which process consists in reacting a polyhydric phenol having hydroxyl groups in meta-position to each other, and having a side chain, with a hydroxide of a mercurial aromatic hydrocarbon.

The invention comprises also as a new article of manufacture an organic mercury compound which has two aromatic radicals of which one carries a free phenolic hydroxyl group and also an alkyl group or an aralkyl group.

Particularly useful products of manufacture and the specific embodiments for producing same are to be seen from the examples indicated further below.

The new mercury compounds thus obtained are distinguished from the known products of reaction of phenol with the hydroxide of a mercurial aromatic hydrocarbon, especially R.Hg.OH, by their solubility in dilute aqueous alkalies, the pH-value of which must be greater than that of sodium carbonate. Owing to the presence of the free hydroxyl group the new mercury compounds are soluble without decomposition in aqueous solutions of alkalies of the kind named, as is evident from the fact illustrated by Example 1, that from such solutions the compound is reprecipitated by means of an acid, for instance, carbonic acid.

The new mercury compounds are useful, for instance, as disinfectants, preservatives and seed-steeping agents.

The following examples illustrate the invention:

Example 1

58.8 grams of phenyl mercurihydroxide and 30 grams of pyrocatechol are intimately mixed with each other and the mixture is introduced into a solution of 16 grams of NaOH in 1600 cc. of water. The whole is shaken for 20 minutes at room temperature and then carbon dioxide is passed through the solution. There is precipitated a white-grey body which after having been washed and dried melts at 161° C. The yield is almost theoretical. The mercury content of the product is 52.19 per cent., whereas the theoretical amount for a mono-mercury compound of pyrocatechol of the formula: $C_6H_5.Hg.O.C_6H_4.OH$ is 51.9 per cent.

Example 2

29.4 grams of phenyl mercurihydroxide are dissolved in 500 cc. of boiling water. To this solution 20 grams of pyrocatechol dissolved in 50 cc. of water are added. A white-grey body is precipitated which, when washed and dried, melts at 161° C. The yield and mercury content are the same as in Example 1.

Example 3

5 grams of phenyl mercurihydroxide are dissolved in 200 cc. of boiling water and 4 grams of phenylethylresorcinol are added to the solution which is then heated for 20 minutes on a waterbath. A sticky mass is first formed on the bottom of the vessel which, however, gradually solidifies and is finally converted into a brown-yellow powder. When washed and dried this powder melts at 145° C. The yield is nearly theoretical. The mercury content is 40.66 per cent. The theoretical value for the phenyl-ethylresorcinol-mono-mercuri-phenyl compound of the formula:

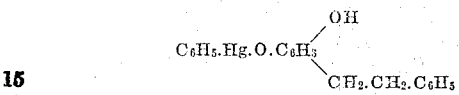

6-phenyl-ethyl-3-phenyl-mercury-oxy- 1 - phenol or 6-phenyl-ethyl-1-phenyl-mercury-oxy- 3 - phenol is 40.88 per cent.

*Example 4*

29.4 grams of phenyl mercurihydroxide are dissolved in 800 cc. of boiling water and 15 grams of pyrogallol dissolved in 100 cc. of water are added. The pyrogallol mercury compound separates in the form of a grey-brown body the yield being almost theoretical. The mercury compound does not show a satisfactory melting point since it decomposes when heated. The mercury value is 59.8 per cent. and that theoretical for the pyrogalloldimercuridiphenyl compound of the formula:

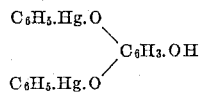

is 59.1 per cent.

We claim:

1. A process for making organic mercury compounds, which consists in reacting a polyhydric phenol free from acid radicals, having a hydroxyl group incapable of taking part in the reaction, with a hydroxide of a mercurial phenylic hydrocarbon.

2. A process for making organic mercury compounds, which consists in reacting a polyhydric phenol free from acid radicals, having hydroxyl groups in ortho-position to each other, with a hydroxide of a mercurial phenylic hydrocarbon.

3. A process for making organic mercury compounds, which consists in reacting resorcinol having a side chain and being free from acid radicals, with a hydroxide of a mercurial phenylic hydrocarbon.

4. 6-phenyl-ethyl - 3 - phenyl - mercury-oxy-1- phenol having the formula:

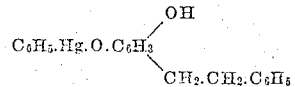

KARL MEMMINGER.
BERNHARD GAUDIAN.